W. A. STEPHENS.
AUTOMATIC TIRE SIGNAL.
APPLICATION FILED NOV. 22, 1919.
1,388,007.
Patented Aug. 16, 1921.
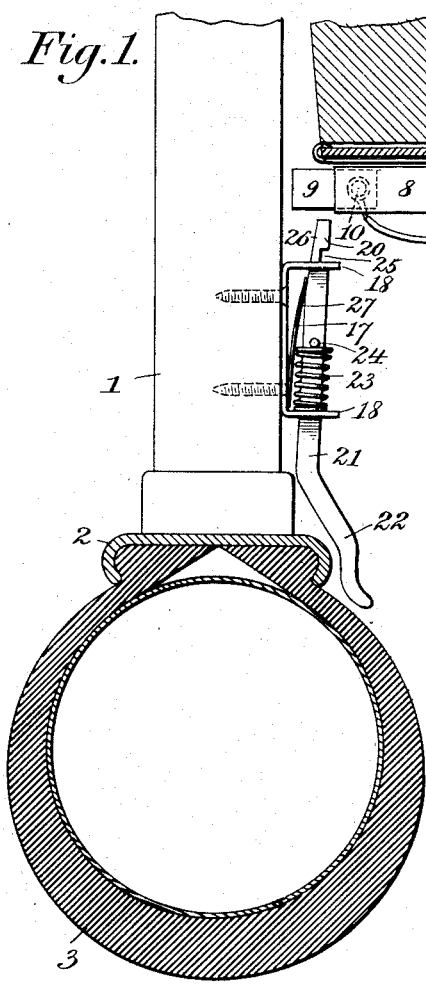
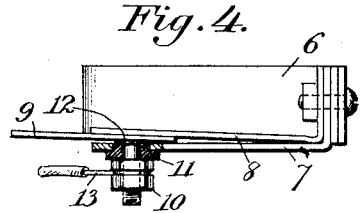
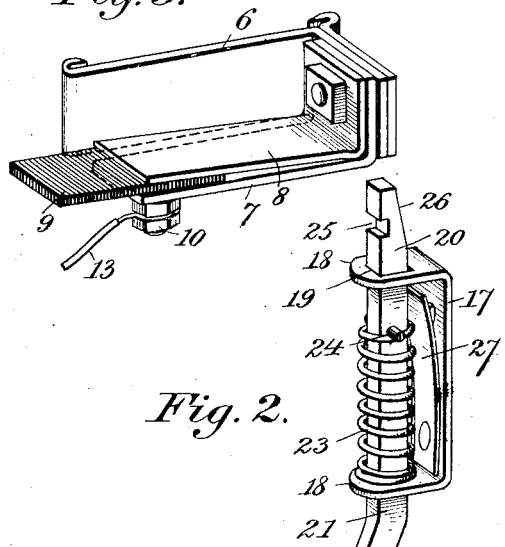
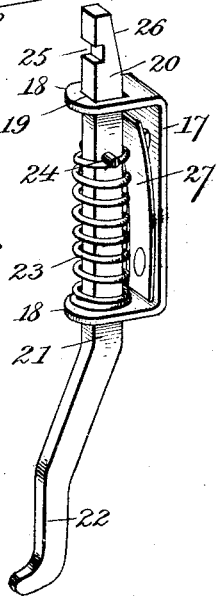
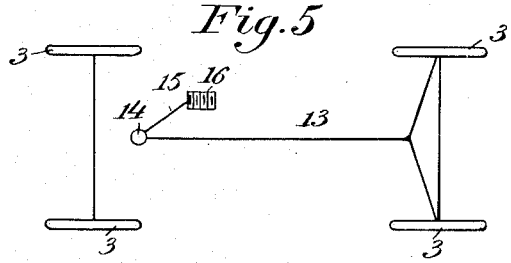
W. A. Stephens
INVENTOR
ATTORNEY

UNITED STATES PATENT OFFICE.

WILLIAM ANTHONY STEPHENS, OF OAKLAND, CALIFORNIA.

AUTOMATIC TIRE-SIGNAL.

1,388,007.  Specification of Letters Patent.  Patented Aug. 16, 1921.

Application filed November 22, 1919. Serial No. 339,834.

*To all whom it may concern:*

Be it known that I, WILLIAM A. STEPHENS, a citizen of the United States residing at Oakland, in the county of Alameda, and State of California, have invented a new and useful Automatic Tire-Signal, of which the following is a specification.

This invention has reference to tire signals for automobiles, and its object is to provide automatic means whereby, on the occasion of a tire softening to a sufficient extent to become detrimental to the tire, a signal is given and the operator of the vehicle has ample warning that the tire needs attention so that in the event of a slow leak which might proceed until the tire was flat, such harmful condition need not be reached.

The invention comprises a trigger-like structure arranged to be attached to one of the spokes of the wheel and to be in close relation to but out of operative relation with the inflated tire. Carried by some fixed part of the wheel, say a portion of the wheel brake, there is an electric switch normally out of the path of the trigger but in position to be engaged by the trigger when the latter, which is ordinarily held inactive, is released and thus causes the actuation of the switch to the closed position. The arrangement is such that when the trigger is actuated a signal is given, thus apprising the operator of the dangerous conditions and the need of immediate attention.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:—

Figure 1 is a substantially radial section taken between the spokes of a wheel showing the trigger and switch in elevation and the tire and brake structure in section.

Fig. 2 is a perspective view of the trigger.

Fig. 3 is a perspective view of the switch controlled by the trigger.

Fig. 4 is a side view of the switch shown in Fig. 3.

Fig. 5 is a diagram of the electric circuits.

Referring to the drawing, there is shown a spoke 1 of an ordinary automobile wheel provided with a rim 2 and shown in Fig. 1 as carrying a pneumatic tire 3, the lay-out of the pneumatic tires being indicated diagrammatically in Fig. 5. Fig. 1 illustrates a portion of a wheel and also a portion of a brake drum 4 without going into details of construction of the brake drum. The showing of Fig. 1 is to be taken as indicative of any one of the four wheels of the automobile and reference to one wheel will answer for all of them. Fig. 1 also shows, more or less conventionally, a brake band 5. As is customary, the drum 4 rotates with the wheel and the brake band 5 does not rotate with the wheel. In the showing of the wheel as so far described no attempt is made to illustrate any particular type of wheel and numerous parts of the structure are omitted as unnecessary for an understanding of the invention.

Secured to the brake band or to a part carried by the brake band or adjacent fixed part of the structure is a bracket 6 carrying an arm 7 and a second arm 8 in juxtaposition thereto, the arms having corresponding ends spaced away from their point of connection to the bracket. The arms are sufficiently elastic to permit the introduction between their free ends of an insulating strip or leaf 9. The free end of the arm 7 carries a binding post 10 separated from the arm 7 by insulation 11 and terminating in a head 12 so situated as to make contact with the arm 8 in the absence of the strip 9 but contacting with the arm 8 when the strip 9 is moved away from between the two arms. The binding post 10 is designed to receive one end of a conductor 13, the other end of which is carried to a signal 14, which may be either audible or visible, and the signal is connected by a conductor 15 to a battery 16, such as the usual storage battery or a special battery. The signal 14 may be conveniently placed upon the dash of the automobile.

Fast to a spoke 1 is a guiding bracket or yoke 17 having spaced terminal portions 18, each with a passage 19 to guide one end 20 of a trigger structure 21 having the other end 22 bent with relation to the end 20 so that with said end 20 in the bracket 17 the end 22 will lay close to and preferably slightly out of contact with the pneumatic tire 3. That portion of the trigger 21 between the ends 18 of the bracket 17 is surrounded by a spring 23, indicated as a helical spring. The portion of the trigger between the ends of the bracket is traversed by a pin 24 so that the spring 23 is confined between the pin 24 and one end 18 of the bracket 17. The passage 19 in one or both of the ends 18 may be a square passage to prevent the trigger from turning about its longitudinal axis, while the extremity of the end 20 is formed with a notch or recess 25 which may be entered by one wall of the passage 19. The opposite side of the extremity 20 from the recess 25 is beveled, as shown at 26. The notched end of the trigger is urged toward the corresponding end 18 of the bracket by a spring 27 so that by moving the trigger lengthwise, and thereby compressing the spring 23, the notch 25 is brought opposite the adjacent wall of the passage 19 and is snapped thereinto by the action of the spring 27. On releasing the trigger it is held in the engaged position by the action of the spring 27 and this position is such that the wheel may revolve without the end 26 of the trigger coming into contact with the insulating leaf or plate 9.

This is the position of the parts under normal running condition, that is, the trigger is engaged by one end 18 of the bracket 17 so that the leaf or plate 9 is out of its path and consequently the trigger remains inactive. If now, a puncture or blow-out should occur in the tire, the latter will flatten causing the sides of the tire to bulge so that it engages the trigger 22, rocking the end 26 in a direction to move the notched portion 25 out of locking engagement with the end 18 and the reaction of the compressed spring 23 thereupon forces the trigger toward the hub portion of the wheel. Then as soon as the wheel has rotated a sufficient distance the end 26 of the trigger is brought into contact with the leaf or plate 9, forcing the latter from between the arms 7 and 8 which latter have a tendency to approach and there is thereupon established a circuit from the battery 16 through the conductor 15 through the signal 14, thence through the conductor 13 to the binding post 10 to ground by way of said binding post and the arm 8, which in turn is connected to ground. As soon as this occurs the signal 14 will sound an alarm if an audible signal, or give indication if of the visual type, and such signal will continue until attention is given to the defective tire.

It is very detrimental and frequently destructive to tires to have the automobile travel on the tires when flat and consequently such condition should not be permitted to continue any longer than absolutely necessary, and the defect should be remedied as quickly as possible. By the invention notice is given of a puncture before the tire has flattened sufficiently to cause material harm, and this is particularly the case with slow leaks. A blow-out usually gives audible notice of its occurrence but a slow leak may cause the flattening of the tire and the operator of the vehicle may continue with such flat tire for a relatively long distance before it is discovered. This cannot occur with the invention since long before the tire has sufficiently flattened to cause rim cuts notice is given of the impending danger. Furthermore, in the case of rapidly acting punctures notice is given quickly so that the possibility even then of riding on a flattened tire where the puncture is not noticed, is eliminated. Whether the deflation of the tire be caused by slow or rapid leaks the signal is effectively produced.

What is claimed is:—

1. Means for indicating deflation of automobile pneumatic tires, comprising a trigger attachable to a portion of the automobile wheel, locking means for holding the trigger in retracted position, and a normally open circuit closer having interposed insulating material temporarily lodged in the path of the trigger for complete discharge of said insulating material from the circuit closer and the closing of the latter.

2. In means for indicating deflation of automobile pneumatic tires, a guide bracket for attachment to the spoke of the automobile wheel carrying the tire, a slidable trigger, mounted in the bracket, with one end shaped to lock in the guide bracket, a spring carried by the guide bracket for imparting to the trigger a normal tendency toward the locked position, and the trigger extending beyond one end of the guide bracket, and a normally open electric switch arranged for attachment to a fixed part of the vehicle and adapted to be held in the open position by removable insulating material, said insulating material being in the path of the trigger, to be engaged thereby when the trigger is released, for causing the closing of the switch.

3. In means for indicating deflation of automobile pneumatic tires, a trigger for attachment to the wheel and a normally open electric switch for attachment to a fixed part of the vehicle and having a normal tendency to close and provided with displaceable means for holding the switch open, and the trigger having a normal tendency to move into position to engage the displaceable means, and provided with a lock for holding the switch open and a portion in the path of the tire, when deflated, to release the trigger to engage the displaceable means of the switch.

4. In means for indicating deflation of automobile pneumatic tires, an elongated rod forming a trigger with one end of the rod bent at an angle to the other end and the second named end of the rod provided with a notch adjacent to its extremity, a guide bracket for the rod for holding the latter to a spoke of the automobile wheel for movement lengthwise thereof and for holding the trigger in the retracted position with the notch engaging the guide bracket and the other end of the trigger adjacent to the inflated tire, said trigger having spring means for projecting the trigger, when released, from the guide bracket, and a switch for attachment to a fixed part of the automobile, and provided with separating means formed of readily displaceable insulating material in the path of the trigger, when released, whereby to cause the closure of the switch.

In testimony, that I claim the foregoing as my own I have hereto affixed my signature.

WILLIAM ANTHONY STEPHENS.